United States Patent [19]

Abels et al.

[11] 4,056,160
[45] Nov. 1, 1977

[54] ELECTRICALLY POWERED VEHICLE WITH POWER STEERING

[75] Inventors: Theodor Abels; Siegfried Püschel, both of Aschaffenburg, Germany

[73] Assignee: Linde Aktiengesellschaft, Wiesbaden, Germany

[21] Appl. No.: 662,165

[22] Filed: Feb. 27, 1976

[30] Foreign Application Priority Data

Jan. 3, 1975 Germany .......................... 2508938

[51] Int. Cl.² .............................................. B62D 5/06
[52] U.S. Cl. ...................................... 180/143; 60/431; 60/DIG. 2; 417/44
[58] Field of Search ............... 180/143, 141, 142, 133, 180/132, 79.1; 60/423, 422, 431, DIG. 2; 417/44, 410

[56] References Cited

U.S. PATENT DOCUMENTS

| 2,356,492 | 8/1944 | Smith | 180/142 |
| 2,557,796 | 6/1951 | Price | 180/143 |
| 3,630,025 | 12/1971 | Henry | 60/DIG. 2 |
| 3,911,679 | 10/1975 | Matthews | 60/DIG. 2 |

*Primary Examiner*—Richard A. Bertsch
*Assistant Examiner*—John A. Pekar
*Attorney, Agent, or Firm*—Karl F. Ross

[57] ABSTRACT

An electrically powered vehicle, e.g. a forklift truck or other utility-type battery-powered vehicle, is provided with a hydraulic power-steering system with a pump driven by an electric motor. A circuit is provided to cut out the power-steering pump motor when the vehicle attains an elevated speed, thereby reducing battery drain during period in which power-steering is not normally required.

11 Claims, 4 Drawing Figures

ELECTRICALLY POWERED VEHICLE WITH POWER STEERING

FIELD OF THE INVENTION

Our present invention relates to an electric vehicle system and, more particularly, to battery-powered electric vehicles with hydraulic power-assist steering.

BACKGROUND OF THE INVENTION

Battery-powered vehicles, e.g. utility-type or so-called "floor" vehicles such as forklift trucks and like industrial vehicles for shifting loads, removing stacked loads from a storing location, and for stacking loads, generally comprise an electric motor for driving the vehicle wheels and a suitable control system for increasing the voltage applied to this motor to increase the vehicle speed. The power source is a battery which may be charged during periods in which the vehicle is inactive.

It is known further to provide such vehicles with power-steering systems or power-assist steering arrangements to ease the steering operation and prevent tiring of the operator, especially since vehicles of this type must be maneuvered frequently in small spaces. Such power-assist steering systems can comprise a hydraulic arrangement which allows the wheels of the vehicle to be steered with or without assistance by a hydraulic medium.

In other words the device may comprise a hydraulic power arrangement having a pump driven by an electric motor which is connected across the battery and to a hydraulic medium. The pump feeds a hydraulic motor, e.g. a piston-and-cylinder arrangement, to displace the steering linkage in proportion to the rotation of a steering wheel or other control element so that all of the steering force need not be contributed by the operator.

Such a power-assist arrangement can be operated without the auxiliary force supplied by the hydraulic mechanism, either via a direct mechanical connection between the steering wheel and the steering linkage or by having the steering wheel operate upon a displacement-type pump which drives the hydraulic medium into a power cylinder connected to the steering linkage. In either case the motor-driven pump supplies the hydraulic medium under pressure to assist in the steering movement so that the force necessary to swing the linkage and the steerable wheels connected therewith need not be supplied exclusively by the operator.

The required steering force is, however, in many operating conditions relatively minimal. For example, when the vehicle is moving rapidly, little if any auxiliary force is necessary to assist in the steering movement which can be accomplished, even with large loads, easily by the operator. However, at relatively low vehicle speeds the steering action must overcome a frictional force and, especially with large loads, requires considerable force. To avoid tiring the operator, the power-assist device is especially useful in these operating states.

Thus, during part of the time at least in which the vehicle is used, it is not essential to have power-assist steering while at other times it is practically essential.

With battery-power vehicles an important economical consideration is to limit unnecessary drain upon the battery so that the current drain therefrom should be as little as possible. When, as has been the case customarily heretofore, the power-steering pump is continuously driven by its electric motor, there is an unnecessary drain during those periods in which the power-assist function is unnecessary.

To avoid this disadvantage it has been proposed to turn on the pump only in case of need, e.g. when the steering wheel is exposed, upon turning, to a steering force which exceeds a predetermined level (see German published application - Offenlegungsschrift No. 1 480 205).

The difficulty with this arrangement is that the threshold force on the steering wheel must be first reached before the pump is turned on and is capable of providing a power-assist function. For the driver or operator this is inconvenient since he first must apply steering forces up to the threshold level without assistance and must then respond in his steering movements to the substantially instantaneous commencement of the power-assist function during the steering operation.

OBJECT OF THE INVENTION

It is the principal object of the present invention to provide a vehicle of the aforedescribed type without the disadvantages of the conventional power-steering system and which permits steering operations by the driver of the vehicle in an optimum manner while minimizing the energy drain on the battery.

SUMMARY OF THE INVENTION

This object and others which will become apparent hereinafter are attained, in accordance with the invention, by a system which we have developed based upon our recognition that large steering forces are required substantially only when the steering wheels must be turned, relatively rapidly and the wheels are rolling relatively slowly (or are stopped) so that there is a relatively large frictional force applied to resist the steering operator at the contact surfaces between the wheels and the ground. This friction is of course greatest when the vehicle is at standstill and decreases with increasing rotation of the wheels, i.e. increasing speed of the vehicle.

Thus, we have discovered that the battery drain can be minimized while the disadvantages of the conventional system eliminated by providing control means whereby the power-assist steering pump is driven for speeds of the vehicle below a predetermined speed. The latter generally corresponds to high speed operation of the vehicle or the highest speed thereof. The power-assist pump is cut off during this high speed propulsion of the vehicle.

The invention thus comprises, in association with control means for varying the propulsion speed of the vehicle, circuit means connected to such control means and responsive to the setting thereof at a high propulsion speed for discontinuing the electrically driven motor of the power-steering pump from the battery.

If the control system comprises a sliding-contact speed control arrangement, the device for cutting off the power-steering pump electromotor can respond to the setting of the sliding contact control to a high-speed position or one of several high-speed positions.

When the control means is a pulse controller with keying means for generating the stepped voltage necessary for increasing propulsion speed, the circuit means of the present invention can include a threshold value detector for the control voltage at the driving circuit or for the keying ratio whereby, at the predetermined threshold, the power-steering electromotor is turned off.

In either arrangement, the power-steering pump is turned off when the vehicle is in a high-speed setting of its propulsion control circuitry corresponding to high current drain from the battery by the propulsion motor, the pump motor being energized at all lower speeds.

This is permissible since, at high propulsion speeds a rapid operation of the steering mechanism is neither desirable nor safe and is seldom, if ever, necessary. Furthermore, at high propulsion speeds, even rapid operation of the steering mechanism requires only a minimum steering force.

In the prior-art power steering system described above, in which an electrically driven pump provides a powerassist function when the force applied to the steering wheel attains a predetermined level, it has already been proposed to provide a delay circuit which delays the cutoff of a pump when the force falls below the threshold value to prevent sudden or brief interruption of the steering movement from eliminating the power-assist function and producing a hunting-type ON-OFF operation of the power-steering arrangement.

We have found a delay circuit to be advantageous in the present system as well and our delay circuit is used to prevent the turning on of the power-steering motor when the vehicle speed drops for brief periods below the threshold speed at which the power-assist motor is turned off. We have found that such reduction in the propulsion speed setting of the control device occur, for example, during coasting operation of the vehicle, and the spontaneous operation of the power-assist motor at such time may create a dangerous situation.

The delay circuit of the present invention is thus designed to retard re-energization of the pump motor for a predetermined period subsequent to the movement of the control means into a lower speed setting.

We have found that normally there is no need for a power-assist function immediately after the control system is shifted to a lower speed setting from its highest speed setting since generally the vehicle is operating at a sufficient speed to allow steering without the power-assist function and a power-assist function during high-speed movement of the vehicle, until it reaches a lower speed, is neither desirable nor completely safe.

We may provide, in addition, a time-delay circuit also for maintaining the operation of the power-assist pump even when the propulsion controller of the vehicle is shifted briefly into its highest speed settings.

BRIEF DESCRIPTION OF THE DRAWING

The above and other objects, features and advantages of the present invention will become more readily apparent from the following description, reference being made to the accompanying drawing in which.

SPECIFIC DESCRIPTION

In the description below, when reference is made to a power-steering system comprising a pump, reservoir, power cylinder and steering linkage, it should be understood that the system may be of the type described at pages 411 ff. of PRINCIPLES OF AUTOMOTIVE VEHICLES, U.S. Government Printing Office, Washington, D.C. 1956.

Figure 1:
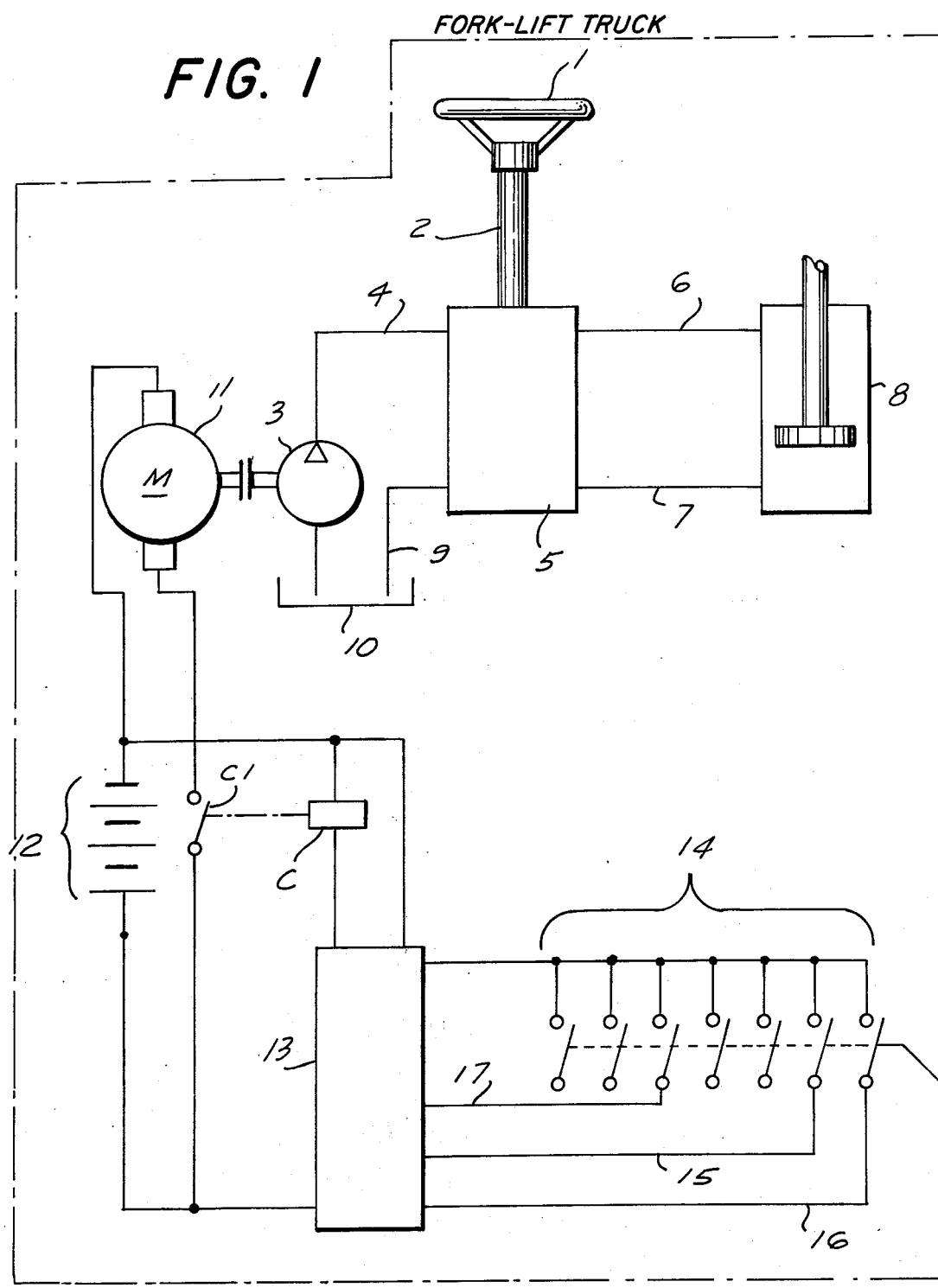
FIG. 1 is a diagram of a power-steering system according to the invention showing the hydraulic elements.

In FIG. 1 of the drawing we show a steering wheel 1 connected by a steering column 2 to a control valve assembly 5 as described in the aforementioned publication. The control valve assembly 5 is provided between a pump 3 and a power cylinder 8 whose piston is connected to the steering linkage as also described in the aforementioned publication. The output side of pump 3 is connected by hydraulic line 4 to the valve 5 which has a pair of lines 6, 7 extending to the cylinder 8. The return from the control valve is via line 9 to a pressureless reservoir 10 communicating with the intake side of the pump 3.

The pump 3 is driven by an electric motor 11 connected across the propulsion battery 12 of the vehicle in series with the contacts C1 of a relay C which is operated by the electronic timing circuit 13 as will be described in connection with FIG. 2. The vehicle switching arrangement is represented generally at 14 and includes switches for setting the vehicle speed and switches connected to the control circuit via conductors 15 and 16 for setting the vehicle direction (i.e. forward and reverse).

Figure 3:
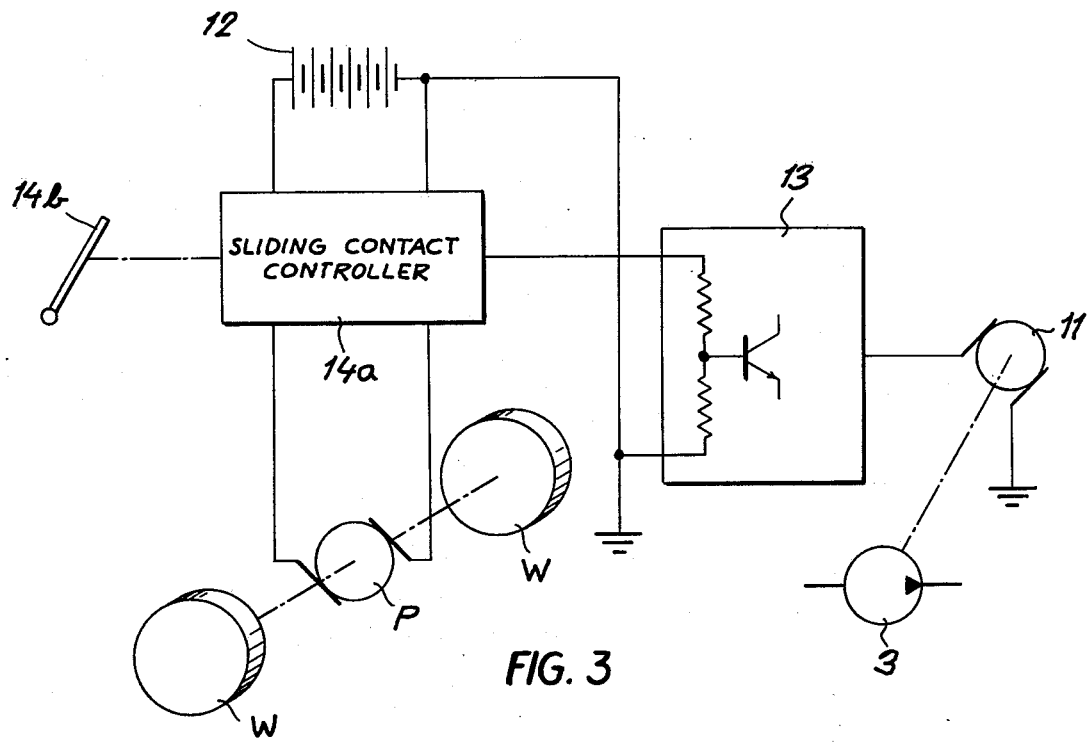
FIG. 3 is a diagram showing the system applied to a slidingcontact controller.

In FIG. 3 we have shown an arrangement whereby, instead of the individually operated switches, the propulsion speed controller is a sliding contact controller 14a energized by the battery 12 and having its output connected to a propulsion motor P driving the wheels W of the vehicle. The sliding contact controller may be operated by a pedal 14b.

Figure 4:
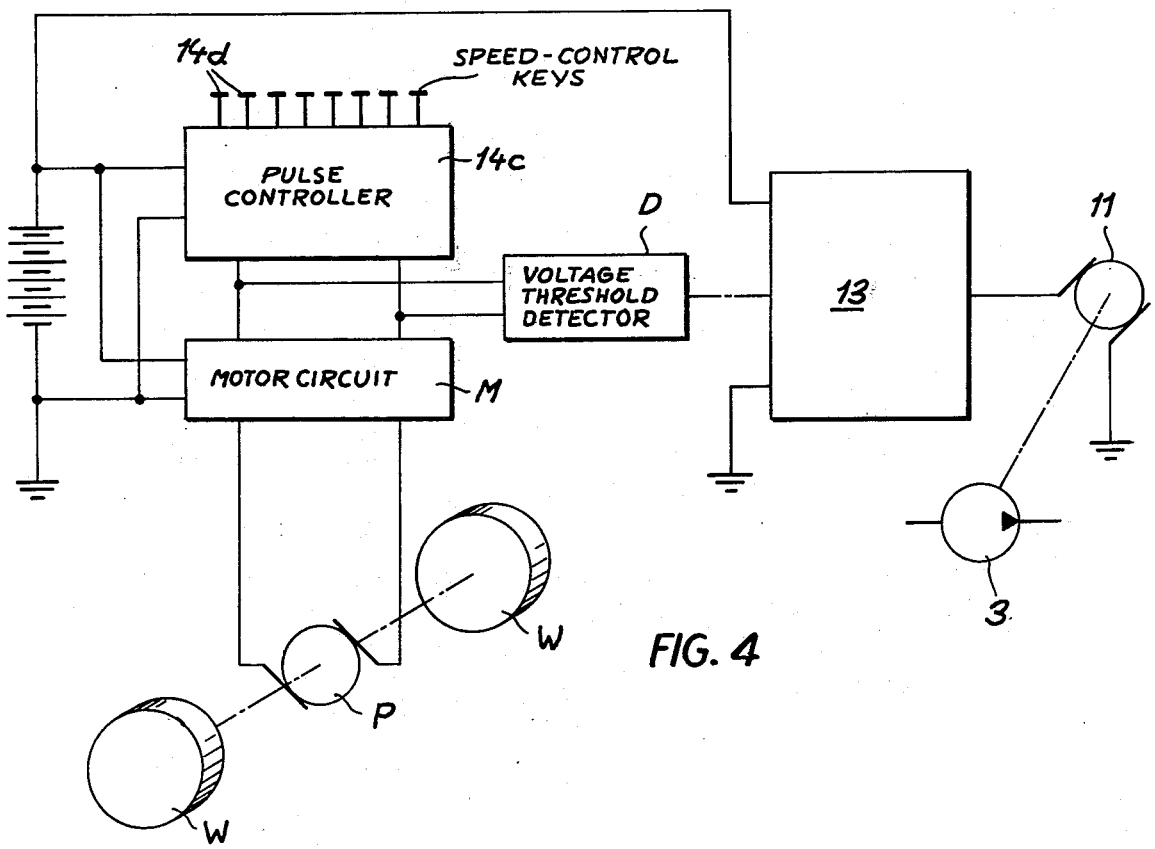
FIG. 4 is a diagram showing the system applied to a pulse control.

In FIG. 4 we show an arrangement whereby a pulse controller is provided at 14c to set the vehicle speed and can have speed control keys 14d for selecting successively higher speeds and applying correspondingly higher voltages to the propulsion motor P driving the wheels W. In this case, a voltage threshold detector D can be provided between the controller 14c and the time circuit 13 which operates the power-assist motor 11 driving the pump 3. The pulse controller 14c provides a control voltage to the motor circuit M which is detected by the detector D.

Figure 2:
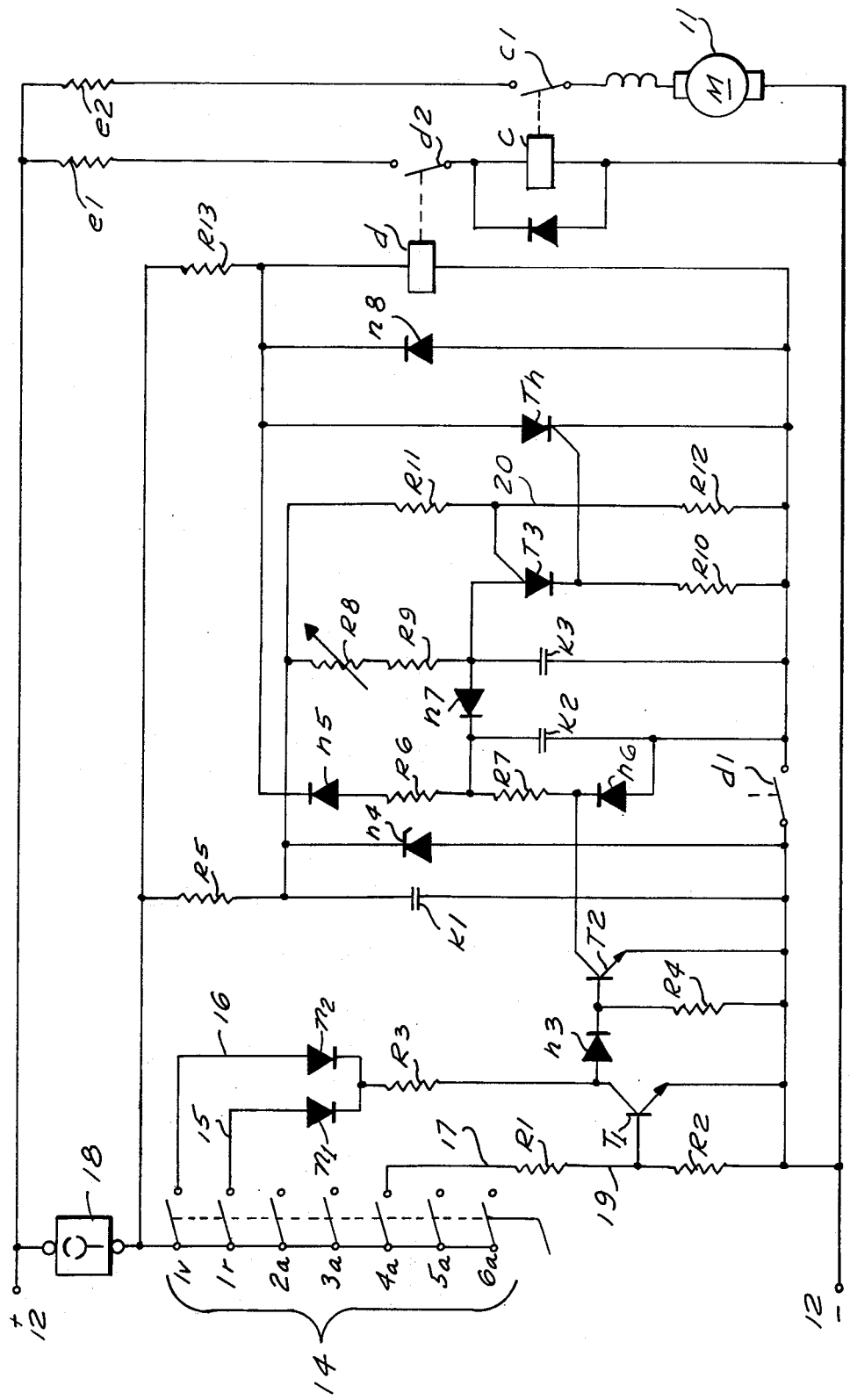
FIG. 2 is a circuit diagram of the control system for the power-steering motor.

As can be seen from FIG. 2, the basic circuit elements comprise the switches 1v and 1r, selecting respectively the forward and reverse speeds, and switches 2a – 6a of the switching arrangement 14 selecting progressively higher speeds at which the propulsion motor P can be operated. One contact of each of these switches is connected in series with a main power switch 18 to the positive terminal of the battery 12. The positive terminal of the battery 12 is also connected in series with the contact C1 and the motor 11 to the negative terminal of the battery 12.

Also connected across the battery 12 is a contact d2 in series with the coil C of the relay, which coil is bridged by a diode. A resistor R13 is connected in series with the switch 18 to the positive terminal of the battery 12 and also lies in series with the coil of the relay d, the holding contact d1 of the latter battery and the negative terminal of the battery 12.

The switches 1v and 1r are connected via leads 15 and 16 to respective diodes n1, n2 to a resistor R3 tied to the collector of an NPN transistor T1 and to the corresponding propulsion motor windings (not shown). The collector of transistor T1 is connected by another diode $n3$ to the base of an NPN transistor T2 whose base bias is provided by a resistor R4. The base bias for transistor T1 is provided by a resistor R2 forming part of a voltage divider network with a resistor R1 which is connected to a contact of a high-speed switch $4a$ of the speed control key switches 14 for the vehicle.

The collector of NPN transistor T2 is connected between a diode $n6$ and a resistor R7 on the other side of switch $d1$, the resistor R7 forming a voltage divider network with another resistor R6 is connected by a diode $n5$ to a relatively positive portion of this circuit, e.g. the side of resistor R13 connected to the coil $d$. A time constant network is formed by a potentiometer R8 in series with a resistor R5 which, in turn, is connected to the positive terminal of the battery 12 through the switch 18. The potentiometer R8 is connected in series with a fixed resistor R9 and with a capacitor K3 to the negative terminal of the battery through the contacts $d1$ of the relay $d$. A diode $n7$ connects the tap of the voltage divider $r6 - r7$ with the junction of the capacitor K3 and resistor R9 and is rearwardly poled. A further capacitor K2 is bridged across the network of diode $n6$ and resistor R7.

The junction of diode $n7$, capacitor K3 and resistor R9 is connected to the base of a transistor T3 whose cathode is connected via resistor R10 to the negative terminal of the battery 12 in series with the contacts $d1$. A gate of a thyristor Th is connected between the resistor R10 and the cathode of transistor T3 whose trigger electrode is connected to a voltage divider formed by a pair of resistors R11 and R12 in series across the capacitor K1 and the breakdown diode $n4$ which lie across the terminals of the battery in series with the resistors R5.

The anode of thyristor Th is connected via a resistor R13 to the positive terminal of the battery while its cathode is connected through the contacts $d1$ to the negative battery terminal.

A diode $n8$ is connected across the relay coil $d$.

The circuit 13 illustrated in FIG. 2 has the main circuit breaker or fuse switch 18 in series with the drive switching 14 which has a first set of keys switches $1v$ and $1r$ for selecting forward drive and reverse drive respectively. During forward drive, the contacts $1v$ close to apply a positive potential through the diode $n2$ and the resistor R3 to the collector of transistor T1 and the base of transistor T2.

Alternatively, switch $1r$ can apply the positive voltage to the base of transistor T2 through the diode $n1$ and resistor R3. In either case, the transistor T2 is rendered conducting. When the transistor T2 conducts, a voltage is applied to the coil $d$ so that the latter is immediately energized and the contacts $d1$ and $d2$ are closed. Closure contacts $d2$ apply a current through the coil of relay $c$ which closes the contacts $c1$ to energize the pump motor 11. There is no timedelay network between the transistor T2 and the relay $d$ although one can be provided if such is desired for reasons noted above.

When contact $d1$ closes, capacitors K2 and K3 are connected to the negative terminal of the battery and, since these capacitors are connected to the transistor T2 through the resistor R7 to the negative terminal, the capacitors K2 and K3 cannot be charged. These capacitors are provided for time delay purposes.

It is assumed that the vehicle is now accelerated, e.g. by shifting the drive switching arrangement 14 into the fourth drive stage (contacts $4a$ are closed), no further power steering assistance is required. The contacts $4a$ apply a positive voltage through conductor 17 to the voltage divider $r1$ and $r2$ whereby the base of transistor T1 goes positive and the transistor T1 is conductive. This shuts the base of transistor T2 and turns the latter off. As soon as the transistor T2 is switched into a blocking condition, the upper terminals of the capacitors K2 and K3 are no longer held at a negative potential by transistor T2 and begin to charge through resistors R8 and R9. When the voltage across the capacitors K2 and K3 reaches the threshold voltage at conductor 20 between the resistors R11 and R12, transistor T3 becomes conductive and discharges the capacitor K3 through the resistor R10.

A voltage spike is applied across the resistor R10 which triggers the thyristor Th so that the coil $d$ of the relay is short circuited. Contacts $d1$ and $d2$ open. The opening of contact $d2$ de-energizes the relay $c$ and opens the contacts $c1$ to turn off the motor 11 and terminate the pumping of oil through the power steering system. The vehicle is now operated without power steering drain on the battery and indeed is at a speed such as power steering is not necessary.

When the thyristor Th is rendered conductive, capacitor K2 discharges through resistor R6, diode $n5$ and the thyristor Th. The potential across thyristor Th falls below the conductance-maintaining level and this thyristor is turned off. The time constant capacitor K2 and the ignition capacitor K3 are then charged through the elements R8/R9/K2 + K3 forming the time constant network and produce an ignition pulse. Thyristor Th is again briefly rendered conductive so that capacitor K2 can be discharged. If power steering is required, the vehicle speed is reduced below the level corresponding to switch $4a$ and thereupon transistor T1 is blocked, transistor T2 is rendered conducting and the capacitors K2 and K3 are discharged via resistor R7 and transistor T2 to prevent application of a further ignition pulse to the thyristor. Since the train of ignition pulses for the thyristors is blocked, relay $d$ is energized and power steering is restored in the manner described above.

We claim:
1. A vehicle comprising a battery;
   an electrically-operated propulsion system;
   switch means for connecting said battery to said propulsion system and having a range of speeds including relatively low speeds and at least one relatively high speed and, corresponding thereto, a high speed position and at least one lower speed position;
   a hydraulically operable power steering mechanism for steering said vehicle, said mechanism including a hydraulic pump and an electric motor operatively connected to said pump for driving same upon energization of said motor; and
   circuit means connected between said switch means and said motor for connecting said motor to said battery for operation of said mechanism in a lower speed position of said switch means and decoupling same from said battery in said high speed position of said switch means, said circuit means including a time-delay network delaying the energization of said motor by said circuit means for a predetermined time period subsequent to the operation of said switch means at said high speed position.

2. The vehicle defined in claim 1 wherein said switch means is a sliding contact switch shiftable between positions corresponding to said speeds of operation of said propulsion system, said circuit means being responsive to the position of the sliding contact.

3. The vehicle defined in claim 1, further comprising another time-delay network in said circuit means for delaying the energization of said motor for a predetermined interval subsequent to the displacement of said switch means into a lower speed position.

4. The vehicle defined in claim 1 wherein said circuit means includes a first relay having contacts in series with said motor across said battery; a second relay having contacts in series with the coil of said first relay connected across the battery; a thyristor connected across the coil of said second relay; a transistor network connected to said second relay for energizing same upon the shifting of said switch means into a high speed position; and a further time-delay network connected to said thyristor for delaying the triggering thereof for a predetermined time interval following the switching of said transistor network in a direction tending to de-energize said second relay.

5. The vehicle defined in claim 4 wherein said further time-delay network comprises a first transistor having a normally nonconductive collector-emitter circuit and developing a potential across the collector-emitter circuit upon initial operation of said switch means at a low speed position, a voltage divider network connected between the base of said first transistor and said switch means for energization of the base of said transistor by said switch means upon the shifting thereof to a high speed position for rendering said first transistor conductive, a second transistor having its base connected to the emitter-collector circuit of the first transistor and rendered nonconductive when the collector-emitter circuit of the first transistor becomes conductive, said second transistor having a collector-emitter circuit connected in shunt across the coil of said second relay.

6. The vehicle defined in claim 5 wherein said further time-delay network includes a pair of capacitors, at least one of said capacitors being connected to generate a voltage spike at the gate of said thyristor upon the lapse of a predetermined time period.

7. The vehicle defined in claim 6 wherein said mechanism comprises a power cylinder connected to steerable wheels of said vehicle and valve means between said pump and said cylinder and driven by a steering wheel of the vehicle.

8. The vehicle defined in claim 7 which further comprises a body and a lifting fork on said body and constitutes therewith a fork-lift truck.

9. A vehicle comprising a battery;
an electrically-operated propulsion system;
switch means for connecting said battery to said propulsion system and having a range of speeds including relatively low speeds and at least one relatively high speed, and corresponding thereto, a high speed position and at least one lower speed position;
a hydraulically operable power steering mechanism for steering said vehicle, said mechanism including a hydraulic pump and an electric motor operatively connected to said pump for driving same upon energization of said motor; and
circuit means connected between said switch means and said motor for connecting said motor to said battery for operation of said mechanism in a lower speed position of said switch means and decoupling same from said battery in said high speed position of said switch means, said switch means being a key switching arrangement having respective contacts for the speeds of said propulsion system, said circuit means responding to the control voltage of said switch means.

10. A vehicle comprising a battery;
an electrically-operated propulsion system;
switch means for connecting said battery to said propulsion system and having a range of speeds including relatively low speeds and at least one relatively high speed and, corresponding thereto, a high speed position and at least one lower speed position;
a hydraulically operable power steering mechanism for steering said vehicle, said mechanism including a hydraulic pump and an electric motor operatively connected to said pump for driving same upon energization of said motor; and
circuit means connected between said switch means and said motor for connecting said motor to said battery for operation of said mechanism in a lower speed position of said switch means and decoupling same from said battery in said high speed position of said switch means, said switch means being a key switching arrangement having respective contacts for the speeds of said propulsion system, said circuit means responding to the keying ratio of said switch means.

11. A vehicle comprising a battery;
an electrically-operated propulsion system;
switch means for connecting said battery to said propulsion system and having a range of speeds including relatively low speeds and at least one relatively high speed and, corresponding thereto, a high speed position and at least one lower speed position;
a hydraulically operable power steering mechanism for steering said vehicle, said mechanism including a hydraulic pump and an electric motor operatively connected to said pump for driving same upon energization of said motor; and
circuit means connected between said switch means and said motor for connecting said motor to said battery for operation of said mechanism in a lower speed position of said switch means and decoupling same from said battery in said high speed position of said switch means, said switch means being a pulse control switching arrangement for the speeds of said propulsion system, said circuit means responding to an electrical control voltage parameter of said switch arrangement.

* * * * *

UNITED STATES PATENT AND TRADEMARK OFFICE
CERTIFICATE OF CORRECTION

PATENT NO. : 4 056 160

DATED : 1 November 1977

INVENTOR(S) : Theodor ABLS et al.

It is certified that error appears in the above-identified patent and that said Letters Patent are hereby corrected as shown below:

IN THE HEADING, line /30/ the foreign application priority data, instead of " JAN.3, 1975" should read --MARCH 1, 1975--

Signed and Sealed this

*Twenty-eighth* Day of *February 1978*

[SEAL]

*Attest:*

RUTH C. MASON
*Attesting Officer*

LUTRELLE F. PARKER
*Acting Commissioner of Patents and Trademarks*